US005548892A

United States Patent [19]

Fitz, Jr.

[11] Patent Number: 5,548,892

[45] Date of Patent: Aug. 27, 1996

[54] MACHINE FOR ASSEMBLING AN INSULATION DISPLACEMENT CONNECTOR AND TERMINATING A CONDUCTOR THERETO

[75] Inventor: Charles E. Fitz, Jr., Harrisburg, Pa.

[73] Assignee: The Whitaker Corporation, Wilmington, Del.

[21] Appl. No.: 374,079

[22] Filed: Jan. 19, 1995

[51] Int. Cl.$^6$ .............................. H01R 43/04; B23P 19/00

[52] U.S. Cl. .............................. 29/866; 29/748; 29/749; 29/753

[58] Field of Search .............................. 29/754, 753, 857, 29/564.4, 747, 863, 749, 748

[56] References Cited

U.S. PATENT DOCUMENTS

| | | | |
|---|---|---|---|
| 3,101,765 | 8/1963 | Batcheller | 153/1 |
| 3,875,662 | 4/1975 | Folk . | |
| 4,139,937 | 2/1979 | L'Homme | 29/759 |
| 4,171,566 | 10/1979 | Tominoi . | |
| 4,351,110 | 9/1982 | Folk | 29/749 |
| 4,426,772 | 1/1984 | Collier et al. | 29/753 X |
| 4,516,309 | 5/1985 | Clark | 29/753 X |
| 4,653,187 | 3/1987 | Sowinski | 29/747 X |
| 4,654,952 | 4/1987 | Baldy ga | 29/753 X |
| 4,870,747 | 10/1989 | Maack et al. | 29/863 X |
| 4,973,267 | 11/1990 | Ramelet | 29/866 X |
| 5,083,370 | 1/1992 | Koch et al. | 29/863 |
| 5,099,570 | 3/1992 | Gerhard, Jr. | 29/866 X |
| 5,355,582 | 10/1994 | Saito et al. | 29/863 |

FOREIGN PATENT DOCUMENTS

| | | | |
|---|---|---|---|
| 4-33285 | 2/1992 | Japan | 29/749 |

*Primary Examiner*—Carl J. Arbes

[57] ABSTRACT

The present invention is an improved machine (10) that automatically severs an insulation displacement contact (80) from a carrier strip (90), inserts the contact into an insulating connector housing (210), terminates a wire (242) to the contact (80), and trims the end of the wire flush with the edge of the housing (210). The trimming operation is accomplished during the last part of the contact insertion stroke, after the insulation displacement contact (80) has just begun to engage the wire (242), so that the wire is securely held in place during trimming. A pair of opposite moving slide (126, 132) are utilized where one slide (132) is moved directly by the inserter (28, 260) so that it causes a lever (152) to pivot which in turn moves the other slide (126), carrying the wire trimming blade (192), in the other direction. The lever (152) is arranged so that movement of the one slide (132) results in a greater movement of the other slide (126). Therefore, the movement of the last part of the contact insertion stroke results in a larger movement of the wire trimming blade (192).

13 Claims, 8 Drawing Sheets

MACHINE FOR ASSEMBLING AN INSULATION DISPLACEMENT CONNECTOR AND TERMINATING A CONDUCTOR THERETO

The present invention relates to machines for inserting an insulation displacement contact into a connector housing, concurrently terminating the conductor of an electrical component to the contact, and trimming the length of a wire terminated to the conductor.

BACKGROUND OF THE INVENTION

Machines that automatically sever an insulation displacement contact from a carrier strip, insert the contact into an insulating connector housing, terminate a wire to the contact, and trim the end of the wire flush with the edge of the housing, are necessarily complex and require that certain of the operational steps be performed after other steps are completed. In particular, the trimming to length of the wire is done after it is terminated to the contact so that the wire is firmly held in place by the contact during trimming. This requires two separate operations that occur sequentially, that is, after the contact is inserted into the housing a cutting blade is actuated to sever the terminated wire. It is desirable to overlap some of these operational steps, such as the insertion step and the wire trimming step, to reduce the overall cycle time of the machine. However, such overlapping is dependent, in part, on timing and the length of the insertion stroke. Overlapping is especially difficult to achieve in cases where the parts are extremely small resulting in the need for a relatively short insertion stroke. In these cases lost motion mechanisms and other similar devices are used to accomplish the operations, however, without the desired overlapping. However, these devices increase the complexity of the machine and its cost to manufacture and to maintain. Other means for performing the insertion and trimming functions is by utilizing separate actuators. This solution, of course, also increases the complexity and cost of the machine. What is needed is a machine, for terminating very small contacts to wires, that overlaps the insertion function with the wire trimming function so that the two functions are done concurrently during the insertion stroke with a single actuator.

SUMMARY OF THE INVENTION

A machine and method are disclosed for severing an insulation displacement contact from a carrier strip and inserting the contact into a connector housing while concurrently terminating a wire of an electrical component to the contact. The machine includes a frame and an inserter coupled to the frame. The inserter is arranged to hold and move the contact in a first direction into inserted engagement with the housing and into terminated engagement with the wire. A trimming mechanism is provided and is operable by the inserter for severing the wire to length during the moving of the contact in the first direction.

DESCRIPTION OF THE PREFERRED EMBODIMENT

Figure 1:
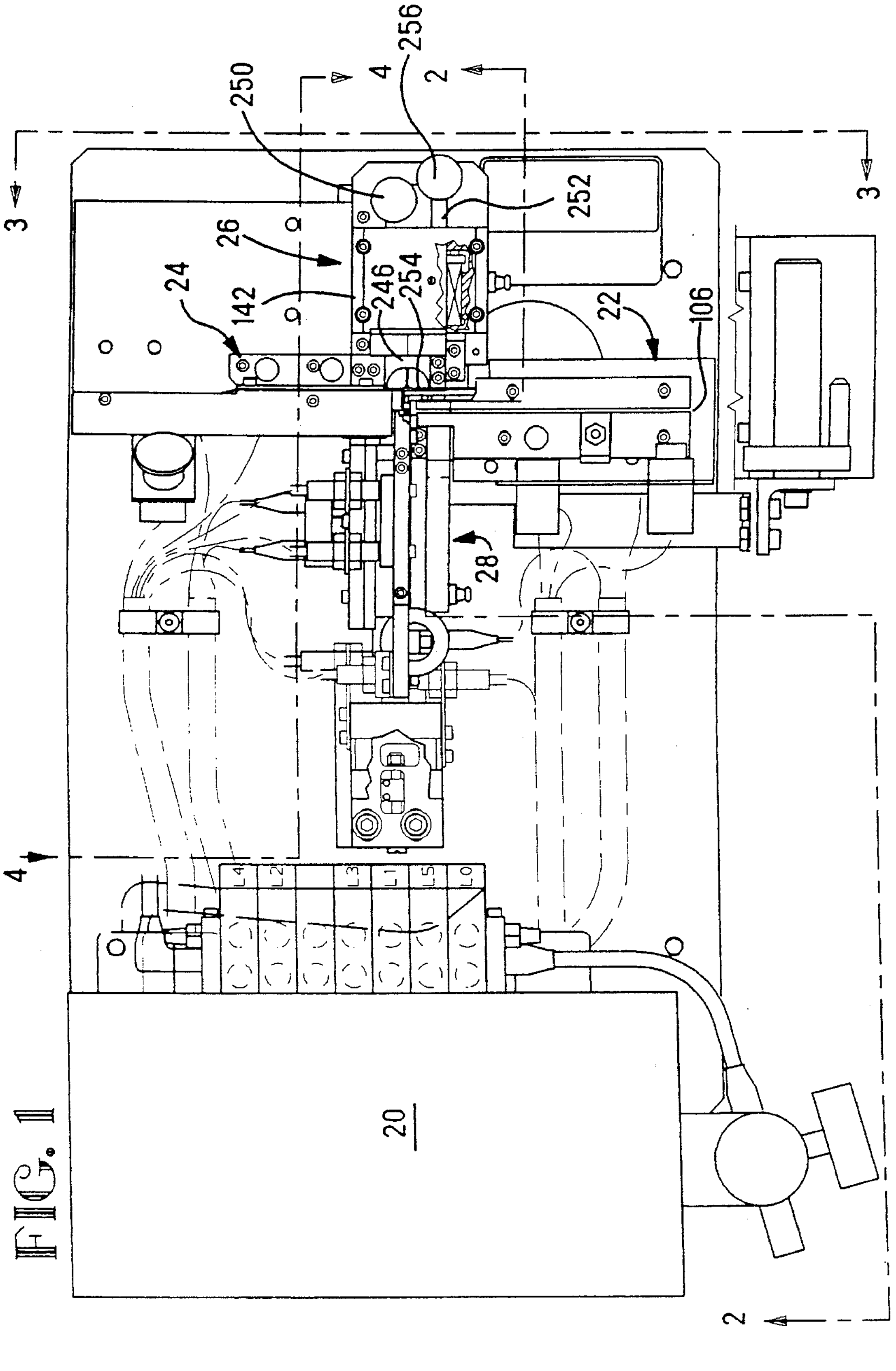
FIG. 1 is a plan view of a machine incorporating the teachings of the present invention.

There is shown in FIG. 1, 2, 3, and 4 a machine 10 having a frame 12 consisting of a base plate 14 and a locating bar 16 rigidly attached to the base plate by means of the screws 18. A controller 20 is mounted to one end of the base plate 14 and includes electrical circuitry for controlling the various operating functions of the machine 10. While the controller 20 will not be described further here, the various functions that it controls will be described in detail. The four basic functional element of the machine 10 include a contact feed unit 22, a connector housing feed unit 24, a wire trim and housing cutoff unit 26, and contact cutoff and inserter unit 28. The connector housing feed unit 24 is attached to the wire trim and housing cutoff unit 26, which, along with the contact feed unit 22 and the contact cutoff and insertion unit 28, are attached to the locating bar 16, thereby forming an assembly that can be removed from the base plate for maintenance or other purposes as desired.

Figure 2:
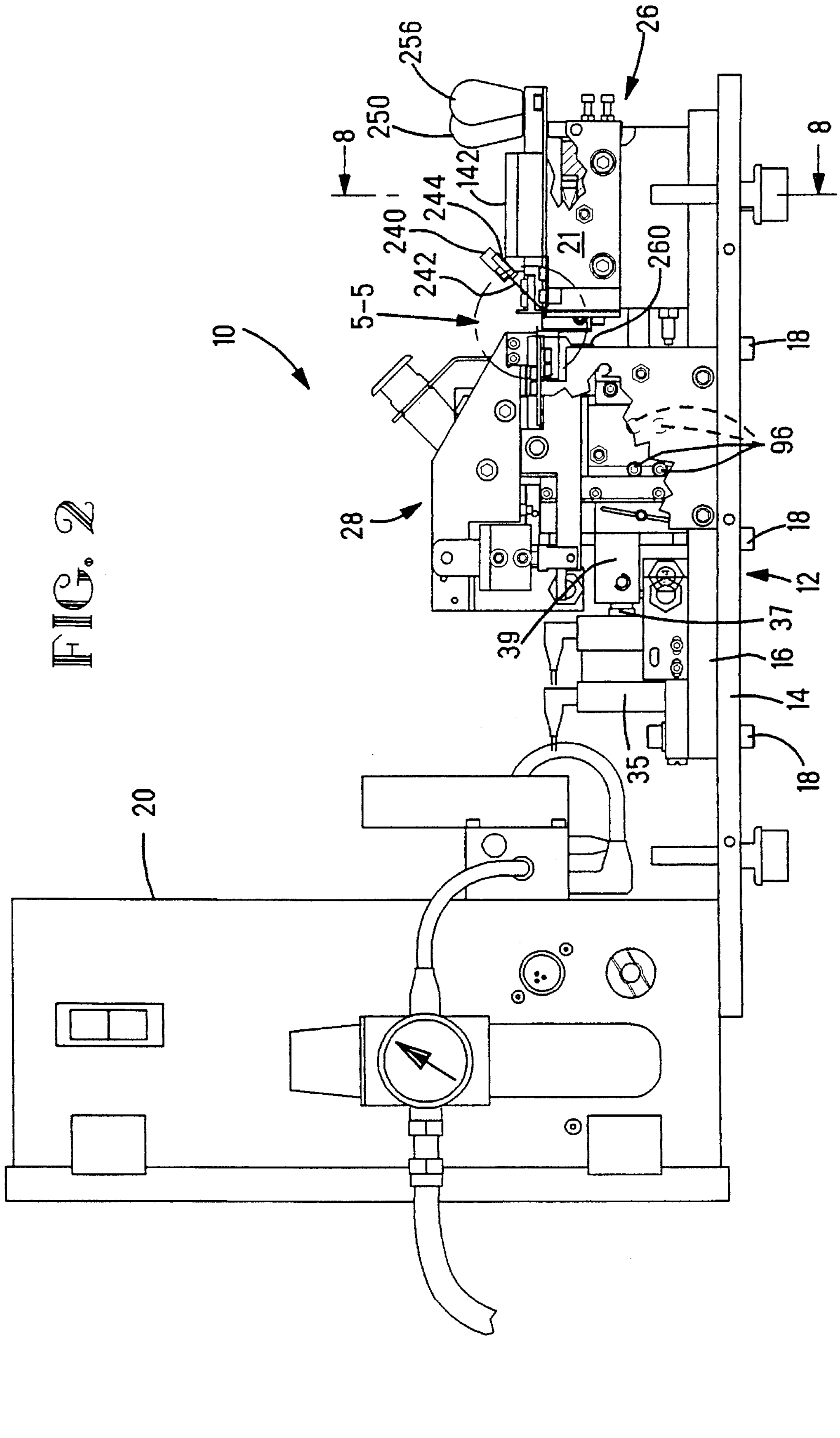
FIG. 2 is a combination of left side and cross-sectional view of the machine taken along the lines 2—2 of FIG. 1.
Figure 3:
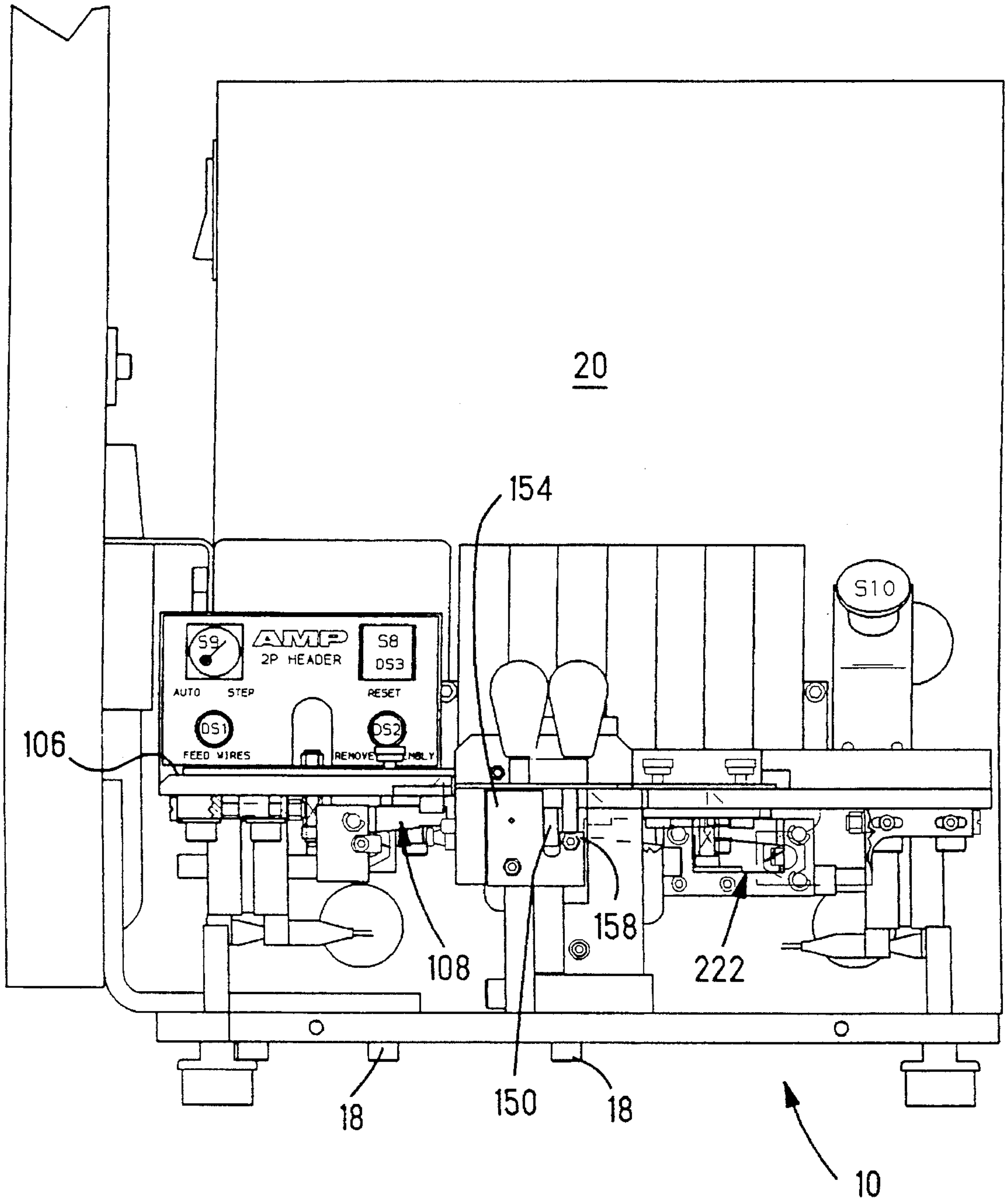
FIG. 3 is a front view of the machine shown in FIG. 1.
Figure 4:
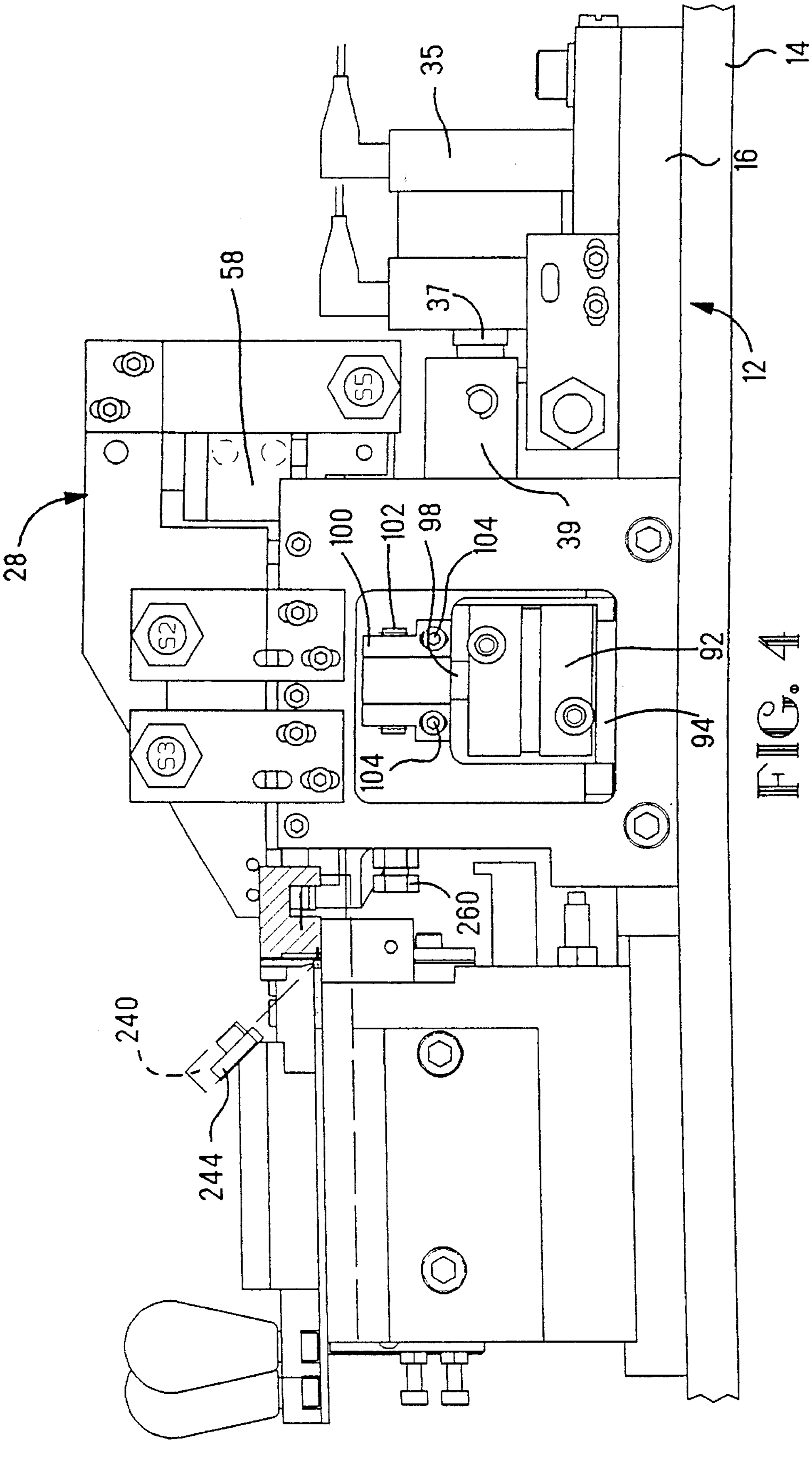
FIG. 4 is a partial cross-sectional view of the machine taken along the lines 4—4 in FIG. 1.
Figure 5:
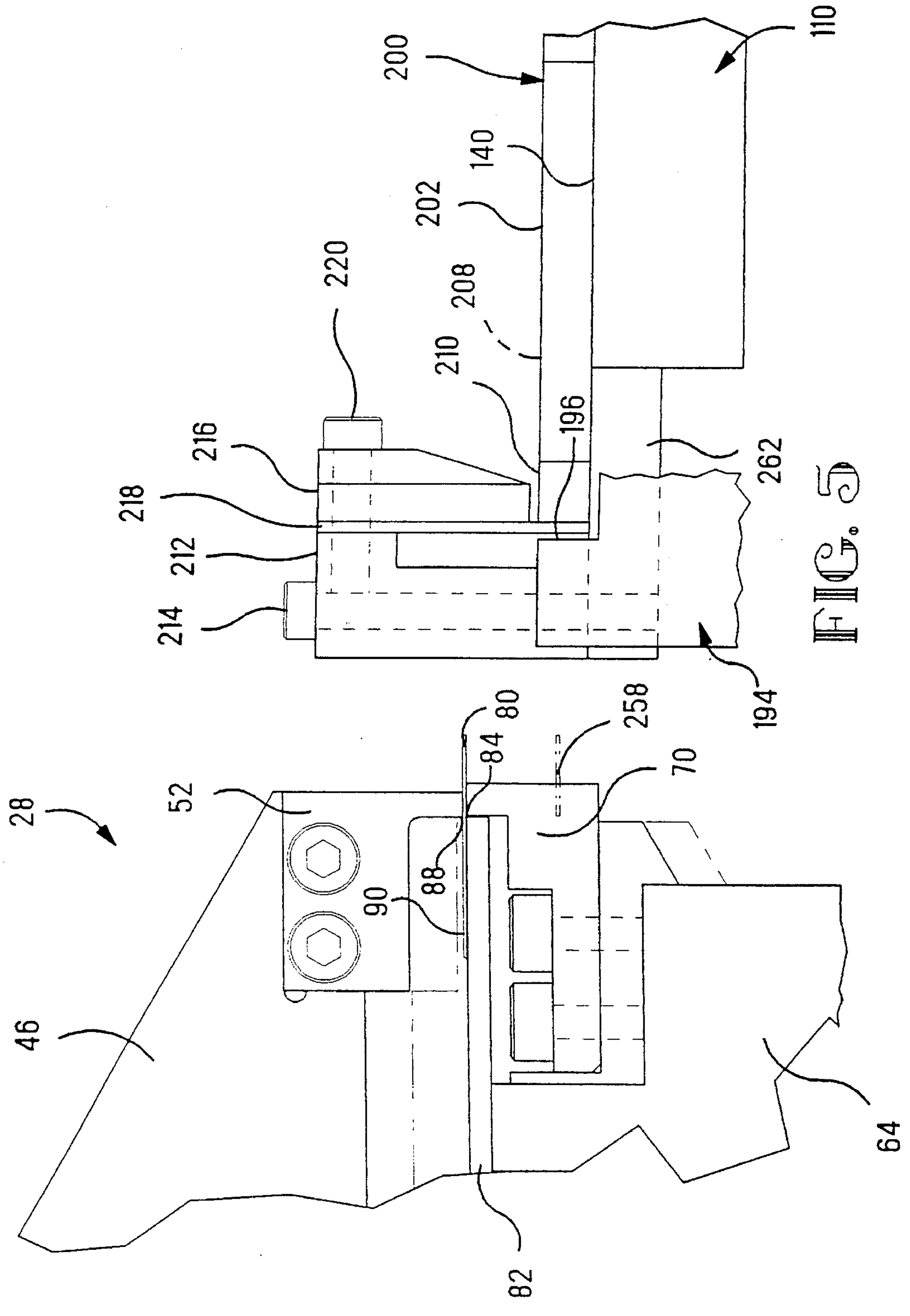
FIG. 5 is an enlarged partial view of the area indicated as 5-5 in FIG. 2.
Figure 7:
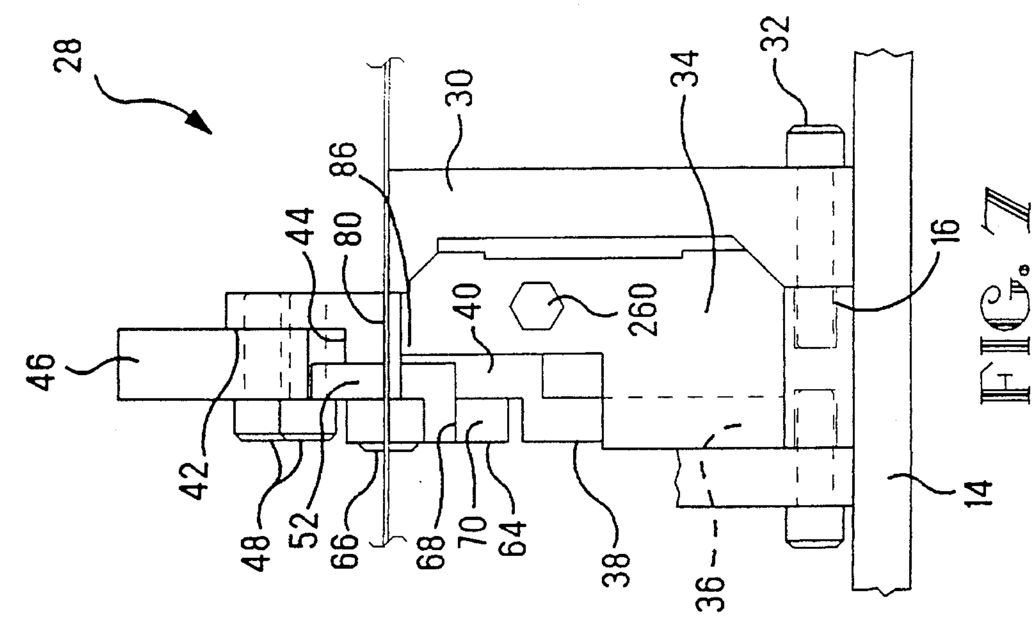
FIG. 7 is a side view of the mechanism shown in FIG. 6.
Figure 6:
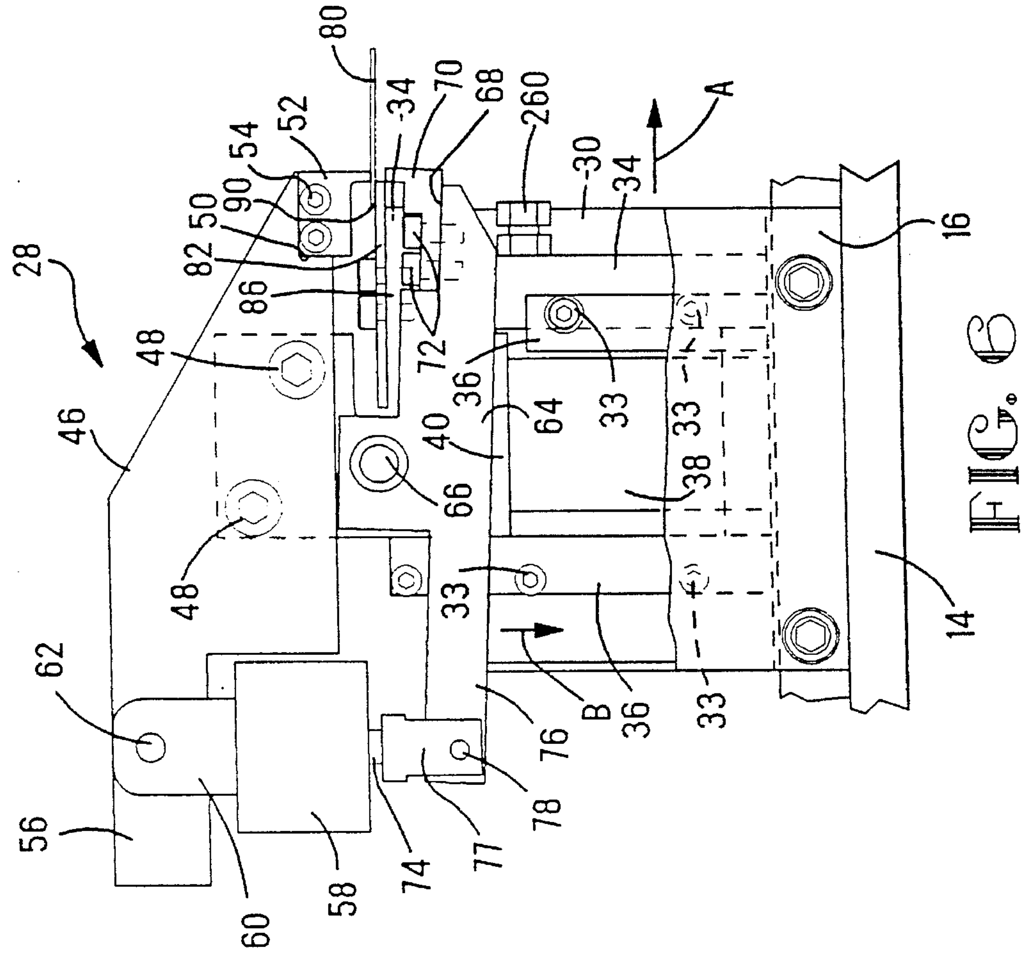
FIG. 6 is an enlarged view of a portion of the clamping mechanism of the machine shown in FIG. 2.

As shown in FIGS. 1, 2, 6, and 7, the contact cutoff and insertion unit 28 includes a horizontally disposed slide attached to the locating bar 16 by means of screws 32 which are threaded into holes in the bar 16. The slide 30 includes a movable portion 34 that is arranged to move in a first direction, indicated by the arrow A in FIG. 6, and in an opposite direction. Movement of the movable portion 34 is effected by means of an air cylinder 35 that is attached to the frame and has a piston rod 37 that is coupled to the movable portion 34 by means of a clevis and pin 39 in the usual manner. A vertically disposed slide member 38 is arranged to slide within ways formed by gibs 36 that are attached to the movable portion 34 by means of screws 33. The slide member 38 is arranged to move in a direction, indicated by the arrow B in FIG. 6, and in an opposite direction, perpendicular to the first direction, indicated by the arrow A. Therefore, the two slides 30 and 38 provide for orthogonal motion of the member 38 both parallel and perpendicular to the base plate 14. The movable slide 38 includes an extended shank 40 having a recess 42 and adjacent shoulder 44. A fixed clamping member 46 is rigidly attached within the recess 42 and against the shoulder 44 by means of two screws 48. As best seen in FIGS. 6 and 7, the fixed clamping member 46 has another recess 50 at one end thereof containing an upper jaw 52 that is attached thereto by means of two screws 54. The other end of the fixed clamping member 46 has an extended arm 56 to which an air cylinder 58 is anchored by means of a clevis 60 and pin 62. A movable clamping member 64 is pivotally attached to the shank 40 by means of a pin 66. A recess 68 is formed in the end of the clamping member 64 and includes a lower jaw 70 which is secured within the recess by means of two screws 72 which are threaded into holes in the clamping member. As can be seen in FIG. 7, the movable clamping member 64 is offset from the fixed clamping member 46 by an amount that is approximately the same as the thickness of each of the clamping members. However, the lower jaw 70 is offset an equal amount so that it is in clamping alignment with the upper jaw 52. The air cylinder 58 includes a piston rod 74 that is pivotally attached to an arm 76 by means of a clevis 77 and pin 78. The two clamping members 46 and 64 are arranged so that when the air cylinder 58 is actuated the movable clamping member 64 is pivoted about the pivot 66 and the lower jaw 70 engages and clamps two contacts 80 against the upper jaw 52. A shearing plate 82 having a sharp shearing edge 84 is rigidly attached to the top 86 of the movable portion 34 of the slide 30, as shown in FIGS. 5, 6 and 7. The upper jaw 52 includes a sharp shearing edge 88 that is in shearing alignment with the edge 84 of the shearing plate 82. When the slide 38 is moved in the direction of the arrow B, the contacts 80, which are securely clamped between the two jaws, is severed from the carrier strip 90 and moved downwardly a precise amount for a purpose that will be explained. The movement of the slide 38 is effected by means of an air cylinder 92, as best seen in FIG. 4, that is attached to the slide 38 by means of four screws 96, as shown in FIG. 2. The air cylinder 92 has a piston rod 98 that is pivotally attached to a clevis 100 by a pin 102, the clevis being attached to the movable portion 34 by two screws 104. The carrier strip 90 and attached contacts 80 are fed along a track 106, as best seen in FIGS. 1 and 3, by a feed mechanism 108 in the usual manner.

Figure 8:
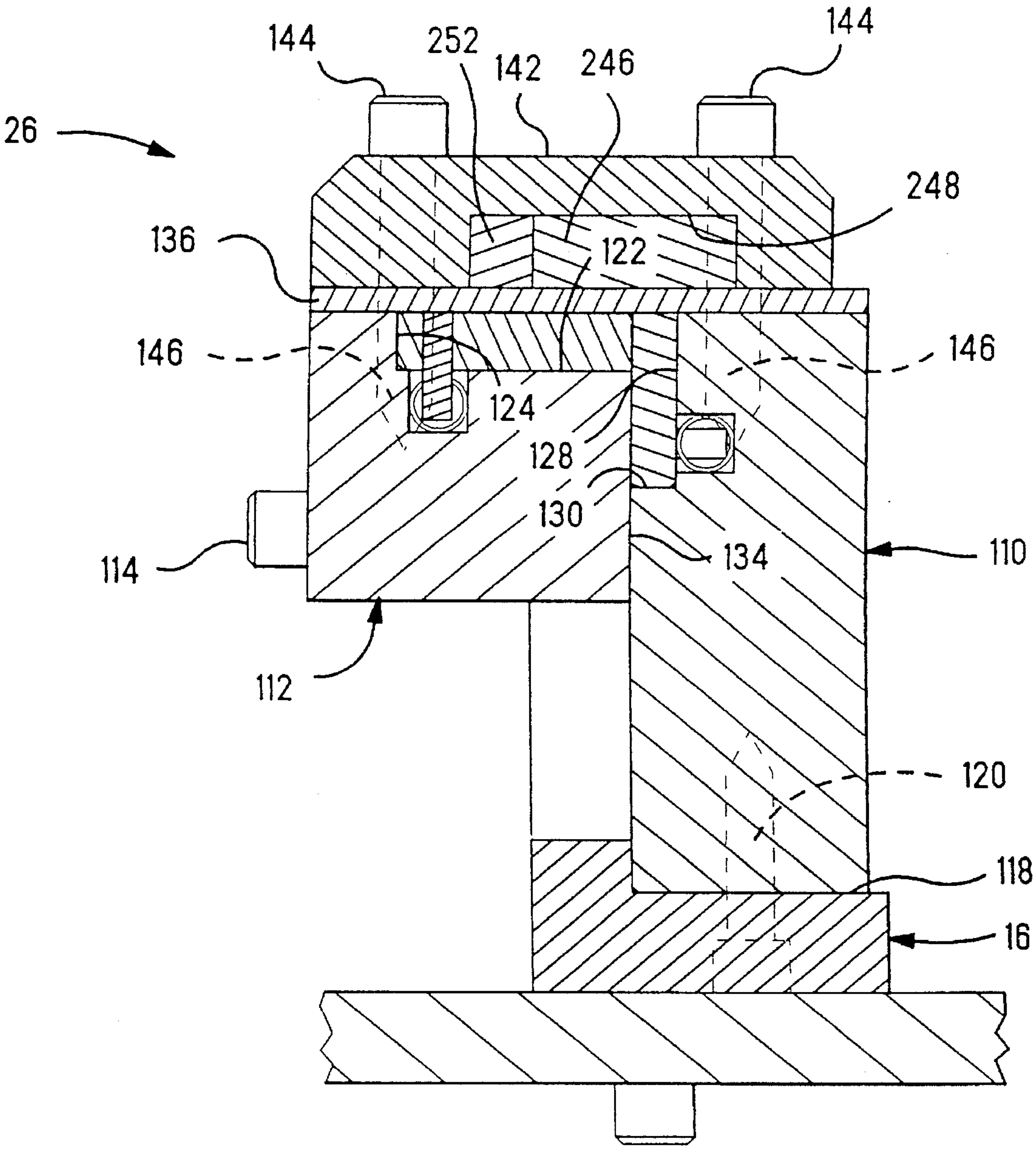
FIG. 8 is a cross-sectional view of the wire trimming and housing cutting mechanism taken along the lines 8—8 of FIG. 2.
Figure 9:
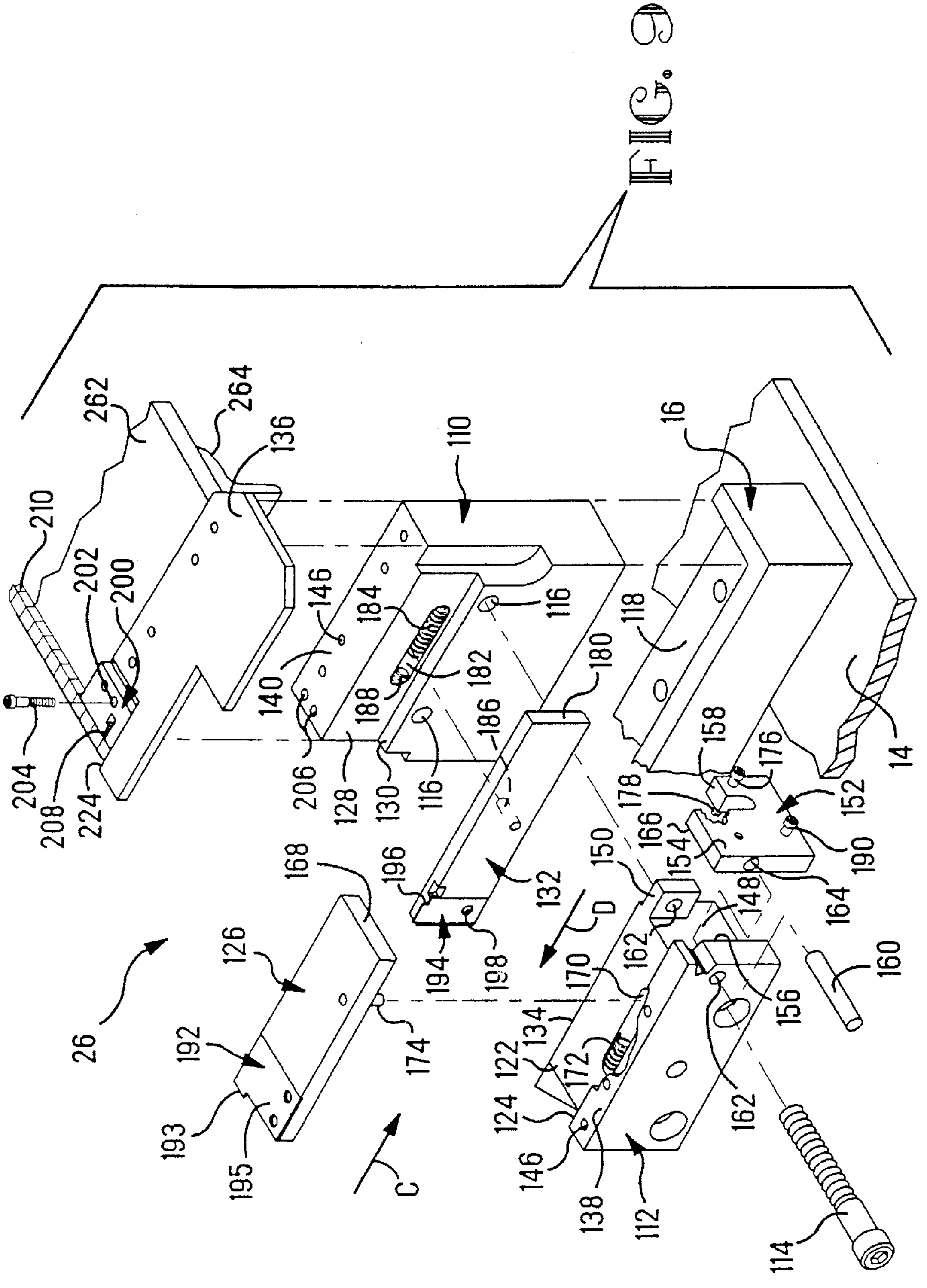
FIG. 9 is an exploded parts view of the wire trimming and housing cutting mechanism shown in FIG. 8.

As shown in FIGS. 8 and 9, the wire trim and housing cutoff unit 26 includes a two part body consisting of a vertical block 110 and a side block 112 attached thereto by means of two screws 114 that are threaded into holes 116 in the vertical block 110. The vertical block 110 is located in a recess 118 formed in the locating bar 16 and secured in place by means of two screws 120 threaded into holes in the bottom of the vertical block 110, as best seen in FIG. 8. The side block 112 has a recessed surface 122 facing upwardly, as viewed in FIGS. 8 and 9, and an adjacent shoulder 124. A first slide bar 126 is in sliding engagement with the surface 122 and shoulder 124. The vertical block 110 includes a recess 128 and adjacent shoulder 130, which along with the side 134 of the side block 112 and the edge of the first slide bar 126 form a channel. A second slide bar 132 is disposed within the channel in sliding engagement with the surface 128 and the shoulder 130, as viewed in FIG. 8. A cover plate 136 is disposed on the top surfaces 138 and 140 of the side block 112 and the vertical block 110, respectively, and is held in place by a saddle 142 and four screws 144 that are threaded into holes 146 in the side and vertical blocks. The cover plate 136 confines the first and second slide bars 126 and 132 is sliding engagement with their respective recesses 122 and 128. As best seen in FIG. 9, the side block 112 includes an undercut 148 at one end thereof and a flange 150 extending outwardly from the floor of the undercut near one side. A lever 152 has a rectangular portion 154 that is received within the undercut 148 between the flange 150 and the wall 156 of the undercut. The lever 152 includes an offset portion 158 spaced from the rectangular portion so that the flange 150 is disposed therebetween, as shown in FIGS. 3 and 9. The lever 152 is pivotally attached to the side block 112 by means of a pin 160 extending through a hole 162 that extends through both the wall 156 and the flange 150 and a hole 164 that extend through the rectangular portion 154.

The lever 152 includes a first end 166 that is arranged to abut a second end 168 of the first slide bar 126 when the slide bar is urged in the first direction indicated by the arrow C in FIG. 9. An elongated opening 170 is disposed in the surface of the recess 122, which contains a spring 172. A pin 174 extends downwardly from the first slide bar 126 and into the elongated opening 170 so that the spring 172 urges the pin and first slide toward the lever 152. A screw 176 having an abutting surface 178 is threaded into a hole in the offset portion 158 so that the screw 176 is in alignment with a second end 180 of the second slide bar 132. An elongated opening 182 is disposed in the surface of the recess 128, which contains a spring 184. A pin 186 extends outwardly from the second slide 132 and into the elongated opening 182 so that the spring urges the pin and second slide in a second direction opposite the first direction, as indicated by the arrow D in FIG. 9. As shown in FIG. 9, the first end 166 of the lever 152 is vertically above the pivot pin 160 while the abutting surface 178 of the screw 176 is vertically below the pivot pin. Therefore, as the second slide 132 is moved in the first direction, indicated by the arrow C, the second end 180 pushes against the abutting surface 178 of the screw 176 thereby causing the lever 152 to pivot about the pin 160 so that the first end 166 pushes against the second end 168 of the first slide bar 126, causing the first slide bar to move in the second direction, indicated by the arrow D. The ratio of movement of the first slide bar to the second slide bar is controlled by the ratio of distances of the first end 166 from the pivot pin 160 and the abutting surface 178 from the pivot pin 160, respectively. This ratio, in the present example is about 2 to 1 so that 0.018 inch movement of the second slide bar 132 in the first direction will cause about 0.036 inch movement in the first slide bar in the second direction. This ability of the first slide bar to undergo greater movement than the second slide bar is important to the operation of the present invention, as will be explained below. A set screw 188 is threaded into a hole in the vertical block 110 so that it intersects the end of the elongated opening 182, and serves as an adjustable stop for limiting movement of the second slide bar 132 in the second direction. Similarly, a screw 190 is threaded into a hole in the lever 152 and arranged to engage the floor of the recess 148 to limit movement of the first slide bar 126 in the first direction. A wire cutting blade 192 having a wire severing edge 193 is attached to a first end of the first slide bar 126 by means of two screws 195 that are threaded into holes in the slide bar. Additionally, a housing cutoff blade 194 having a severing edge 196 is attached to a first end of the second slide bar 132 by one screw 198 that are threaded into holes in the slide bar.

As shown in FIGS. 5 and 9, a shear plate 200 having a top surface 202 is attached to the surface 140 of the vertical block 110 by means of two screws 204 that are threaded into holes 206 in the block 110. The severing edge 196 extends up to and flush with the top surface 202 and in shearing alignment with two shearing edges 208 in the plate 200. Insulated housings 210 that are to receive the contacts 80 are in strip form and shown in phantom lines in FIG. 9, and are interconnected by short segments that must be removed during insertion of the contact. This is accomplished by the severing edges 196 in cooperation with the shearing edges 208 when the second slide bar 132 is moved in the first direction, as indicated by the arrow C in FIG. 9. As best seen in FIG. 5, a bracket 212 is attached to a plate 262 with the screws 214. The plate 262 is attached to the side of the vertical block 110 by means of an angled bracket 264 and suitable screws. The bracket 212 supports a rail 216 and flat spring member 218 that are secured to the bracket by means of screws 220 which are threaded into holes in the bracket. The spring member 218, rail 216, plate 262, and the edge of the shear plate 200 cooperate to form a channel for guiding the strip of housings 210, the spring member serving to urge the housings against the edge of the shear plate. The strip of housings is fed by a feed mechanism 222, shown in FIG. 3, of conventional design. A stop surface 224 extends from the end of the cover plate 136 and limits movement of the strip of housings 210 along the feed path and accurately positions each housing to be cut off by the severing edge 196.

As shown in FIG. 2, an electrical component 240 having a pair of wires 242 to be terminated contacts 80 in a housing 210 is positioned in a nest 244 with the wires extending downwardly through guide slots in a first guide plate 246 and through openings in the insulated housing 210. The first guide plate 246 is arranged to slide within a groove 248 formed in the saddle 142, between a fully forward position shown in FIG. 1 to a retracted position that permits removal of the terminated assembly. The first guide plate 246 is spring biased in its forward position and is manually retracted by means of the knob 250. A second guide plate 252 having an L-shaped end 254 is arranged to slide within the groove 248 adjacent the first guide plate 246 so that the end 254 is in front of and closes the ends of the guide slots in the first guide plate 246. This second guide plate 252 is spring biased in an opposite direction to the first guide plate so that the L-shaped end 254 remains in this position against the end of the first guide plate 246. It may be manually moved away from the guide slots in the first guide plate by pushing the knob 256 forward toward the saddle 142, as viewed in FIG. 1. Therefore, after terminating a component's wires to a housing, the assembly may be removed from the machine by simply pushing the two knobs 250 and 256 in opposite directions.

In operation, a strip of contacts 80 is loaded into the contact feed unit 22 and a strip of housings 210 is loaded into the housing feed unit 24. An electrical component 240 is positioned in the nest 244 with its wire leads 242 extending through the guide slots in the guide plate 246 and through the housing 210. The machine 10 is then cycled to begin operation. The cylinder 58 is actuated to pivot the movable clamping member 64 from its position shown in FIG. 6 to its closed position shown in FIG. 5 where two contacts 80 are securely clamped between the two jaws 52 and 70. The cylinder 92 is then actuated causing the slide 38 to move downwardly in the direction indicated by the arrow B in FIG. 6. This causes the shearing edge 88 of the upper jaw 52 in cooperation with the shearing edge 84 to sever the two contacts 80 from the carrier strip 90. As downward movement continues, the two severed contacts 80 are brought into alignment with the insulated housing 210 as shown in phantom lines at 258 in FIG. 5. The cylinder 35 is then actuated causing the movable portion 34 of the slide 30 to move in the first direction as indicated by the arrow A in FIG. 6. As the insulation displacement contacts 80 enter the housing 210 they begin to engage the wires 242. Concurrently, an abutting screw head 260, as best seen in FIGS. 2, 4, 6 and 7, projecting from the movable portion 34 engages the end of the second slide bar 132 adjacent the cutoff blade 194, pushing the slide bar in the first direction, as indicated by the arrow C in FIG. 9. The second end of the second slide bar engages the abutting surface 178, shown in FIG. 9, causing the lever 152 to pivot so that its end 166 engages the second end 168 of the first slide bar 126 causing it to move in the second direction, as indicated by the arrow D in FIG. 9. At this point there is sufficient interference between the contacts 80 and the wires 242 so that the wires are firmly held in place, although the movable portion 34 still must move an additional amount of about 0.015 inch to fully seat the contacts 80 for proper termination of the wires to the contacts. During this additional movement the cutting edge 193 of the wire cutoff blade 192 engages the wires 242 extending below the housing 210 and severs them flush with the housing. At this point the contacts 80 are fully inserted into the housing and terminated to the wires 242. The cylinder 58 is then reversed to open the jaw 70 and the movable portion 34 of the slide 30 is withdrawn to its position shown in FIG. 2 by reversing the cylinder 35. The slide 38 is returned to its original position, shown in FIG. 6, by reversing the cylinder 92. The two knobs 250 and 256 are manually manipulated as described above, the completed assembly is removed. Additional contacts 80 and a housing 210 are fed into position for the next cycle by the feed mechanisms 108 and 222, respectively, and the process repeated as desired. While, in the present example, wires of an electrical component were terminated to the contacts 80 in the housing 210, individual wires without components attached may also be terminated in this manner.

An important advantage of the present invention is that the wire trimming function is performed concurrently with the contact insertion function thereby reducing machine cycle time. This is done while assuring that the wires being trimmed are held securely in place during the operation thereby improving reliability of the product. Additionally, the two functions are accomplished by means of a single actuator, thereby reducing complexity and costs.

I claim:

1. A machine for severing an insulation displacement contact from a carrier strip, inserting said contact into a connector housing while concurrently terminating a wire to said contact, and trimming said wire to a predetermined length, said machine comprising a frame and an inserter coupled to said frame and arranged to hold and move said contact in a first direction into inserted engagement with said housing and into terminated engagement with said wire, and a trimming mechanism attached to said frame and operable by said inserter for severing said wire to said predetermined length during said moving of said contact in said first direction.

2. The machine according to claim 1 wherein said trimming mechanism includes first and second cutting blades, said first cutting blade being movable by said inserter in a second direction into cutting engagement with said second cutting blade for effecting said trimming of said wire.

3. The machine according to claim 2 wherein said second cutting blade is an anvil attached to said frame.

4. The machine according to claim 2 wherein said first and second directions are mutually opposite.

5. The machine according to claim 1, wherein said inserter includes upper and lower jaws, a first shearing edge associated with said lower jaw, wherein said second shearing edge is movable in a third direction into shearing engagement with said first shearing edge for effecting said severing of said contact from said carrier strip and to move said contact to a position in alignment with said housing for insertion thereinto.

6. The machine according to claim 1 wherein said moving of said contact in said first direction into said inserted engagement with said housing and into terminated engagement with said wire includes moving said contact partially into engagement so that said contact interferes with said wire thereby holding it in place with respect to said housing, and then moving said contact fully into engagement, wherein said severing of said wire occurs during said movement of said contact after partial engagement and prior to full engagement.

7. The machine according to claim 1 wherein said trimming mechanism comprises:

(a) a block fixed to said frame;

(b) a slide movable within said block in said first direction and in a second direction opposite said first direction;

(c) a cutting blade attached to a first end of said slide for engaging and severing said wire when said slide is moved in said second direction; and (d) a lever pivotally attached to said block, wherein a first end of said lever on one side of said pivotal attachment is in abutting engagement with a second end of said slide and a second end of said lever on the other side of said pivotal attachment is coupled to and movable by said inserter so that when said inserter is moved in said first direction said lever is pivoted and said first end thereof pushes against said second end of said slide thereby moving said slide in said second direction causing said cutting blade to sever said wire.

8. The machine according to claim 7 wherein said coupling of said second end of said lever to said inserter comprises a second slide arranged to move in said first and second directions within said block, said second slide having a first end engageable by said inserter and a second end abuttingly engageable with a surface on said second end of said lever, said surface being the end of a screw threaded into said lever.

9. The machine according to claim 8 wherein the distance between said surface of said second end of said lever and said pivotal attachment is less than the distance between said first end of said lever and said pivotal attachment.

10. The machine according to claim 10, wherein said trimming mechanism further includes a secone resilient means arranged to urge said second slide in said second direction.

11. The machine according to claim 10 including second resilient means arranged to urge said second slide in said first direction.

12. In a method of severing an insulation displacement contact from a carrier strip, inserting said contact into a connector housing while concurrently terminating a wire of an electrical component to said contact, and trimming said wire to a predetermined length where said method is performed by a machine having a frame, an inserter coupled to said frame and including a clamp, arranged to hold and move said contact in a first direction into inserted engagement with said housing and into terminated engagement with said wire, and a trimming mechanism operable by said inserter for severing said wire to length during said moving of said contact in said first direction, the steps comprising:

(1) clamping said contact in said clamp;

(2) moving said inserter in a direction perpendicular to said first direction, thereby severing said contact from said carrier strip and aligning said contact with said housing;

(3) moving said inserter in said first direction so that said contact interferingly engages said wire;

(4) then cutting said wire to length concurrently with further moving said inserter in said first direction until said contact is seated in said housing and said wire is terminated to said contact.

13. The method according to claim 12 wherein said trimming mechanism includes a cutting blade movable in a second direction opposite said first direction and wherein step (4) includes moving said cutting blade in said second direction thereby cutting said wire to length.

* * * * *